July 29, 1958  O. MUELLER  2,845,282
PIPE CONNECTOR HAVING ADJUSTABLE ELBOW
Filed Sept. 9, 1950
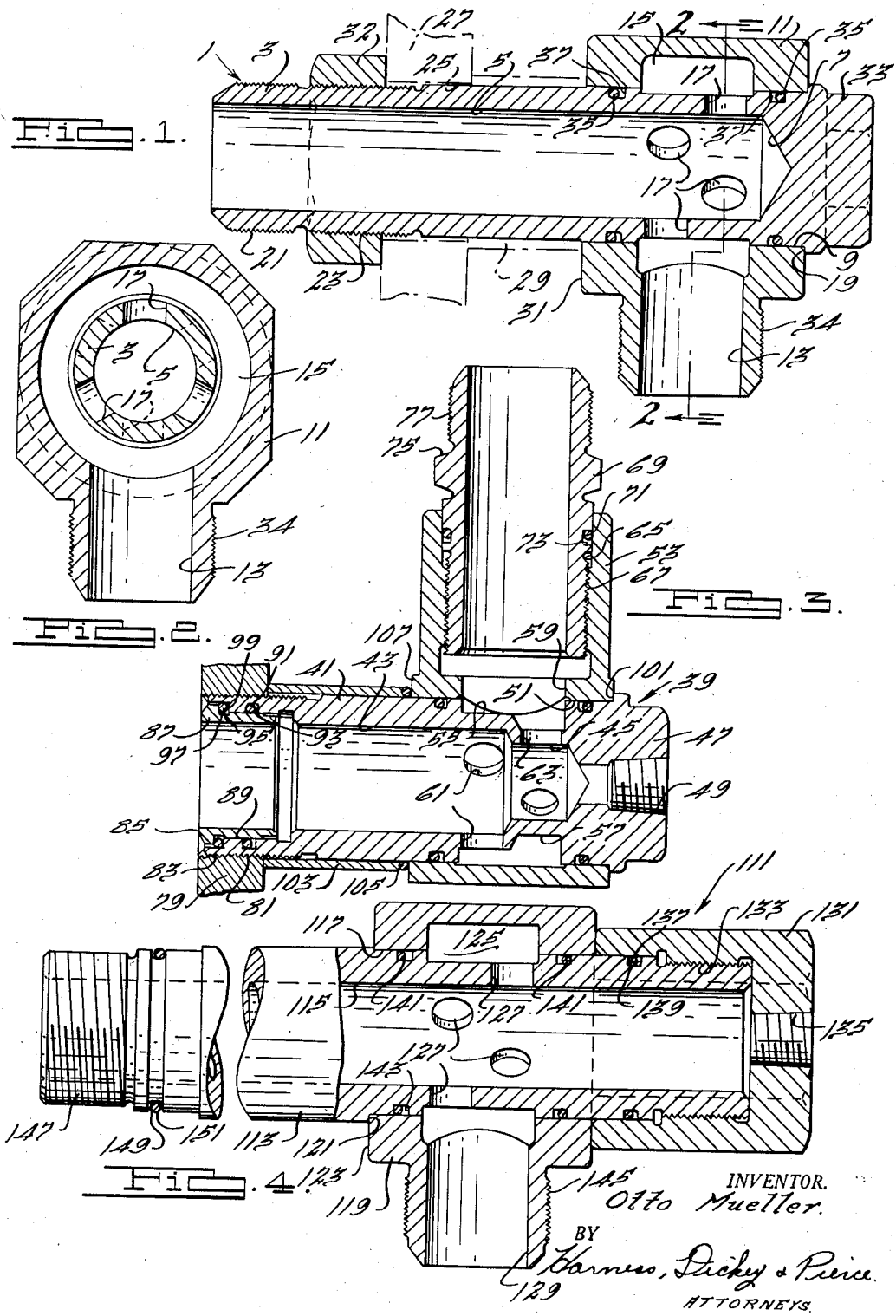
INVENTOR.
Otto Mueller.
BY
Harness, Dickey & Pierce.
ATTORNEYS.

United States Patent Office 2,845,282
Patented July 29, 1958

2,845,282

PIPE CONNECTOR HAVING ADJUSTABLE ELBOW

Otto Mueller, Dearborn, Mich.

Application September 9, 1950, Serial No. 184,054

2 Claims. (Cl. 285—159)

This invention relates to fittings for interconnecting a pair of pipes or similar conduits that extend at an angle to each other and, in particular, refers to pipe connectors having portions that are adjustable relative to each other.

It is the object of this invention to provide a fitting or pipe connector that may be readily manufactured and which is substantially leak-proof in operation.

It is another object of this invention to provide a readily manufactured and leak-proof fitting of the type described for connecting pipes or conduits that extend at an angle to each other.

It is a further object of this invention to provide a readily manufactured and leak-proof fitting for connecting pipes that extend at an angle to each other which contains relatively movable members so that optimum adjustment of the fitting to each of the pipes can be readily accomplished.

The invention provides a fitting which has an inner or first tubular member which extends through an aperture in a second or outer tubular member. The fluid passages or bores within the two tubular members extend at an angle to each other and communicate with each other through the medium of suitable holes formed in the wall of the inner member to open into a chamber formed as a continuation of the outer member fluid passage and surrounding the aforementioned aperture therein which slidably receives the inner member. The inner member is provided with a shoulder against which the outer member is seated and O-rings spaced on opposite sides of the chamber prevent leakage fluid from reaching the shoulder along the wall of the aperture or from escaping in the opposite direction along the surface of the inner member.

Other objects and features of the invention will become apparent upon consideration of the accompanying drawings, wherein:

Figure 1 is an axial section through a connector embodying the invention;

Fig. 2 is a section taken along the line 2—2 of Fig. 1;

Fig. 3 is a section through a modified form of the invention; and

Fig. 4 is a section through a further modified form of the invention.

In the connector 1 illustrated in Figs. 1 and 2, a straight inner member 3 has an axial bore 5 which opens out of one end but which terminates short of the other end as shown at 7. The inner member 3 fits closely within an aperture 9 that is formed in a straight outer member 11 so as to extend at an angle to the fluid passage in the outer member 11 that is provided by the bore 13. The outer member 11 is enlarged in inner diameter and, if desired, the inner member may be somewhat reduced in outer diameter to provide an annular chamber 15 that opens into the aperture 9 and into the bore or fluid passage 13. The chamber 15 extends axially of the inner member 3 and the fluid passage 5 of the latter communicates with the chamber 15, and thus with the fluid passage 13, through the medium of radial holes 17 that are formed in the wall of the inner member 3. Preferably, the holes 17 are formed in series of three each, each series lying in a transverse plane that is axially spaced from the plane of the other series, and each series being displaced angularly about the axis of the passage 5 so that in a diametral plane the holes are axially staggered as indicated in Fig. 1.

The inner member 3 is provided with a radial shoulder 19 that is of larger diameter than the aperture 9 and of larger diameter than the balance of the member 3 so that the inner member may be inserted through the aperture 9 until the shoulder 19 abuts the outer radial face of the outer member 11. The inner member 3 has axially spaced threaded portions 21 and 23 adjacent its end through which the fluid passage 5 opens. In a typical assembly, the inner member 3 will extend through an aperture 25 in a panel or wall 27 and the outer member 11 will be spaced from the outer surface of the wall 27 by a spacer bushing 29 that abuts its inner radial face 31. A nut 32 is threaded on the portion 23 of the inner member to draw the connector 1 up right so that the spacer 29 is tightly pressed against the surface of the wall 27 and the shoulder 19 against the outer member 11. The inner member 3 is provided with a hex head 33 whereby torque may be applied thereto for tightening purposes.

The pipe or other conduit (not shown) on one side of the wall 27 may be connected to the inner member 3 by means of the threaded portion 21. The pipe or conduit (not shown) upon the other side of the wall may be connected to the outer member 11 by means of a threaded portion 34 formed on the outer surface of the member. Leakage of fluid along the aperture 9 confining the joint between the inner and outer member is inhibited by O-rings 35 that are placed in annular grooves 37 formed in the surface of the inner member 3 to open into the aperture 9 on either side of the chamber 15. It is evident that by forming the aperture 9 in the outer surface of the inner member 3 as surfaces of revolution the outer member 11 may be angularly adjusted about the axis of the passage 5 even after a desired assembly to the panel 27 has been effectuated and that this can be accomplished without destroying the effectiveness of the seal provided by the O-rings 35. The interconnection of the pipes on the opposite sides of the panel 37 is thus greatly facilitated by virtue of the permitted relative movement between the inner and outer members.

In the connector 39, shown in Fig. 3, a straight inner member 41 is provided with an interior bore or fluid passage 43 that is reduced in diameter at 45 adjacent the closed end 47 of the member 41. The closed end 47 is provided with a plugged passage 49 that may be readily opened by unscrewing the plug to allow an auxiliary connection (not shown) to the passage 43. The inner member 41, as member 11, is inserted through an aperture 51 in a straight outer member 53. The inner member 41 has a double or stepped reduction in outer diameter as shown at 55 and 57 to provide a chamber of overall length that is substantially equal in volume to that of the fluid passage 59 in outer member 53 that opens into the aperture 51. Two series of radial holes communicate the bore 43 with the bore 59, the first series comprising the apertures 61 extending through the wall of the inner member 41 at the reduced diameter portion 55, the second series comprising apertures 63 extending through the wall of inner member 41 at the reduced diameter portion 57. The outer member 53 has a bore 65 that is threaded at 67 and which communicates with the fluid passage 59. A hollow adapter 69 threads into the threaded bore 67 so as to provide length adjustments between the outer member 53 and the pipe or conduit (not shown) to be connected thereto. This connection is sealed by an O-ring 71 that fits in a suitable groove 73 in the adapter 69 and seals the joint along the outer surface of the bore 65. The adapter 69 has a suitable hexagonal portion 75 to receive torque and is threaded on its outer end 77 whereby it may be screwed to a pipe or conduit.

In a typical application, the inner member 41 of the connector. 39 may be mounted upon a panel 79. The inner member is provided with a threaded exterior 81 that screws into a threaded hole 83 in the panel 79. A bushing 87 has a sliding fit within a bore 89 formed within the inner member 41, the end of the bushing having a lopped seating surface 85 on its extending end. The inner diameter of the bushing 87 comprises an extension of the fluid passage 43. An O-ring 91 is placed within a groove 93 in the end of the inner member 41 to seal the joint between the bushing 87 and the inner member along the bore 89. An O-ring 95 is confined between confronting and axially spaced radial shoulders 97 and 99 on the bushing 87 and the inner member 41 and serves to provide initial pressure for holding the seating surface 85 against an adjacent surface. The O-rings 93 serve to prevent leakage along the threaded portion 81 so that fluid cannot reach the front of the panel 79 from the rear thereof.

The outer member 53 is seated, as before, against a radial shoulder 101 that is formed adjacent the closed end 47 of the inner member 41. It is held in seated position by a spacer bushing 103 that surrounds the inner member 41 to abut the front face of the panel and an O-ring 105 that is compressed between its other end and the radial face 107 of the outer member 53.

In the connector 111 of Fig. 4, a straight inner member 113 has a fluid passage 115 that extends all the way through it. The inner member 113 is inserted, as before, in an aperture 117 in a straight outer member 119 that is substantially the same as the outer member 11 described in connection with Figs. 1 and 2. The inner member 113 has a radial shoulder 121 which abuts the radial face 123 of the outer member 119 to axially position the outer member relative to the fluid passage 115. The outer member 119 has a chamber 125 that communicates with the passage 115 through the radial holes 127 which correspond to holes 17. The fluid passage 129 in the outer member 119 opens into the chamber 125. The outer member 119 is held against the shoulder 121 by a cap 131 that is threaded on the end of the inner member 113 as shown at 133. The cap closes the end of the fluid passage 115 but may be provided with a plugged opening 135 for an auxiliary conduit. The inner end of the cap 131 fits on the outer surface of the inner member 113, and this joint is sealed by an O-ring 137 that is placed in an annular groove 139 in the inner member 113. O-rings 141 fit in grooves 143 on opposite sides of the chamber 125 that are formed in the inner member 113 to open into the joint lying along the surface of the bore 117, thereby preventing escape of fluid passing from passage 129 to passage 115. The outer member 119 may be exteriorly threaded at 145 for connection to a pipe or the like. The inner member 113 may be threaded at its end remote from the cap 131, as shown at 147, and may be also provided with a groove 149 for an O-ring 151 to furnish a seal between the inner member and a pipe to be threaded on portion 147.

From the foregoing embodiments of the invention, it is evident that the present fittings or connectors may be readily produced at low cost and yet are capable of providing a substantially leak-proof adjustable joint for interconnecting conduits that are angularly inclined with respect to each other. It should be observed that since the various fluid passages are straight, they may be machined to a smooth finish, thereby maintaining energy losses at a minimum. Modifications may, of course, be made in the specific structures shown without departing from the spirit and scope of the invention.

What is claimed is:

1. In combination, a panel having a threaded aperture extending only part way through toward the inside of the panel and a reduced diameter aperture coaxial with the threaded aperture extending the rest of the way through the panel and providing a shoulder facing toward the outside of the panel, an inner member having an end threaded into said threaded aperture, said member having a straight fluid passage opening out said end, said passage being enlarged adjacent said end to provide a shoulder facing said panel shoulder but spaced therefrom, a bushing fitting in the end of said fluid passage having a flange portion seated on the panel shoulder spaced from the member shoulder and having a flat end face, an O-ring between the bushing and member shoulders serving to press the bushing against the panel shoulder to provide an initial seal between the flat end face and the shoulder of the aperture of the panel, an O-ring between the outer bushing wall and the wall of the enlarged aperture of the conduit member for sealing the joint therebetween, said fluid passage terminating short of the other end of the inner member, said member having an outer peripheral shoulder facing the outer surface of said panel, an outer member swivelly mounted on the inner member and seated against said outer shoulder, an annular spacer surrounding the inner member between the outer surface of the panel and the adjacent annular face of the outer member and serving to press said member against the outer shoulder of said inner member, said outer member having a fluid passageway disposed at a right angle to the fluid passageway of the inner member in communication therewith in any rotative position thereof.

2. A conductor comprising an elongated cylindrical member having a central aperture communicating with apertures through the wall thereof adjacent to a closed end having an external cylindrical shoulder, said member at the open end having an enlarged passage and an external thread, a bushing in said enlarged passage having a flat sealing end, a sleeve disposed over said member and abutting against said shouldered portion, said sleeve having an annular passageway communicating with the apertures through the wall of the member, an extension on said sleeve having a passageway communicating with the annular passageway thereof, a sleeve adjustably threaded within said extension and containing means thereon by which connection is made to a conduit, sealing means between said adjustable sleeve and said extension and a tubular section on said member abutting said first sleeve for retaining it against said shouldered portion when said member is threaded into the thread of a shouldered aperture to force the end of the bushing into sealed relation with the last said shoulder.

References Cited in the file of this patent

UNITED STATES PATENTS

| | | |
|---|---|---|
| 615,509 | Stevens | Dec. 6, 1898 |
| 927,837 | Delene | July 13, 1909 |
| 1,892,781 | Hoenstine | Jan. 3, 1933 |
| 2,246,436 | Downey | June 17, 1941 |
| 2,400,658 | Shepherd | May 21, 1946 |
| 2,413,878 | Maky | Jan. 7, 1947 |
| 2,438,530 | Woodling | Mar. 30, 1948 |
| 2,459,643 | Hartley | Jan. 18, 1949 |
| 2,469,074 | Mueller | May 3, 1949 |
| 2,481,404 | Donner | Sept. 6, 1949 |
| 2,578,542 | Hanson | Dec. 11, 1951 |